(12) United States Patent
Jo

(10) Patent No.: US 10,067,318 B2
(45) Date of Patent: Sep. 4, 2018

(54) OPTICAL IMAGING SYSTEM

(71) Applicant: SAMSUNG ELECTRO-MECHANICS CO., LTD., Suwon-si (KR)

(72) Inventor: Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/176,600

(22) Filed: Jun. 8, 2016

(65) Prior Publication Data

US 2017/0102524 A1    Apr. 13, 2017

(30) Foreign Application Priority Data

Oct. 13, 2015   (KR) .......................... 10-2015-0142839

(51) Int. Cl.
  *G02B 3/02*   (2006.01)
  *G02B 13/00*   (2006.01)
  *G02B 9/60*   (2006.01)
  *G02B 27/00*   (2006.01)

(52) U.S. Cl.
  CPC ........... *G02B 13/0045* (2013.01); *G02B 9/60* (2013.01); *G02B 27/0075* (2013.01)

(58) Field of Classification Search
  CPC ................................................ G02B 13/0045
  USPC ....................................................... 359/714
  See application file for complete search history.

(56) References Cited

U.S. PATENT DOCUMENTS

| 4,691,996 | A | 9/1987 | Cho |
| 8,233,224 | B2 | 7/2012 | Chen |
| 9,128,267 | B2 | 9/2015 | Ogino et al. |
| 9,335,515 | B2 | 5/2016 | Ota et al. |
| 2011/0013069 | A1* | 1/2011 | Chen ..................... G02B 9/60 348/335 |
| 2012/0243108 | A1 | 9/2012 | Tsai et al. |
| 2013/0342919 | A1 | 12/2013 | Tang et al. |
| 2014/0204480 | A1 | 7/2014 | Jo et al. |

(Continued)

FOREIGN PATENT DOCUMENTS

| CN | 202067015 U | 12/2011 |
| CN | 203759341 U | 8/2014 |

(Continued)

OTHER PUBLICATIONS

Korean Office Action dated Nov. 1, 2016 in Korean Patent Application No. 10-2015-0142839 (18 pages, with English translation).

(Continued)

*Primary Examiner* — James Jones
(74) *Attorney, Agent, or Firm* — NSIP Law

(57) ABSTRACT

An optical imaging system includes a first lens having a positive refractive power, an object-side surface wherein an object-side surface of the first lens is convex and an image-side surface of the first lens is concave, a second lens having a negative refractive power, wherein an image-side surface of the second lens is concave, a third lens having a negative refractive power, a fourth lens having a positive refractive power, and a fifth lens having a negative refractive power, wherein the first to fifth lenses are sequentially disposed from an object side toward an imaging plane.

15 Claims, 9 Drawing Sheets

(56) References Cited

U.S. PATENT DOCUMENTS

| | | | | |
|---|---|---|---|---|
| 2014/0293453 A1* | 10/2014 | Ogino | ................ | G02B 13/0045 |
| | | | | 359/714 |
| 2015/0085381 A1* | 3/2015 | Ota | ......................... | G02B 9/60 |
| | | | | 359/714 |
| 2015/0131170 A1 | 5/2015 | Chung et al. | | |
| 2016/0170182 A1* | 6/2016 | Tanaka | ............... | G02B 13/0045 |
| | | | | 359/713 |

FOREIGN PATENT DOCUMENTS

| | | |
|---|---|---|
| CN | 204086660 U | 1/2015 |
| JP | 61-138225 A | 6/1986 |
| KR | 10-2009-0131805 A | 12/2009 |
| KR | 10-2010-0001525 A | 1/2010 |
| KR | 10-2014-0094334 A | 7/2014 |
| TW | I421557 B | 1/2014 |

OTHER PUBLICATIONS

Korean Office Action dated Mar. 16, 2017 in corresponding Korean patent application No. 10-2015-0142839 (3 pages in English, 3 pages in Korean).

Chinese Office Action dated Jun. 5, 2018 in corresponding Chinese Patent Application No. 201610534989.3. (10 pages in English and 7 pages in Chinese).

* cited by examiner

| FIRST EMBODIMENT ||||||
|---|---|---|---|---|---|
| F number= 2.60 | TTL = 5.65 | | f = 5.50 | | |
| SURFACE NO. | | RADIUS OF CURVATURE | THICKNESS/ DISTANCE | REFRACTIVE INDEX | ABBE NUMBER | FOCAL LENGTH |
| 0 | STOP | | −0.1514 | | | |
| 1 | FIRST LENS | 1.3079 | 0.6766 | 1.544 | 55.0 | 2.620 |
| 2 | | 12.7128 | 0.1000 | | | |
| 3 | SECOND LENS | −6.1178 | 0.3500 | 1.639 | 27.0 | −4.350 |
| 4 | | 5.2954 | 0.1777 | | | |
| 5 | THIRD LENS | 4.4869 | 0.3000 | 1.544 | 55.0 | −28.240 |
| 6 | | 3.3935 | 0.3746 | | | |
| 7 | FOURTH LENS | −3.5577 | 0.3000 | 1.639 | 27.0 | 13.26 |
| 8 | | −2.5954 | 1.0480 | | | |
| 9 | FIFTH LENS | −1.9325 | 0.5427 | 1.544 | 55.0 | −5.000 |
| 10 | | −7.2455 | 0.2171 | | | |
| 11 | FILTER | INFINITY | 0.1100 | 1.517 | 64.2 | |
| 12 | | INFINITY | 0.6725 | | | |
| 13 | IMAGING PLANE | INFINITY | −0.0193 | | | |

FIG. 3

| SECOND EMBODIMENT ||||||
|---|---|---|---|---|---|
| F number= 2.60 | TTL = | 5.20 | f = | 5.80 | |
| SURFACE NO. | | RADIUS OF CURVATURE | THICKNESS/ DISTANCE | REFRACTIVE INDEX | ABBE NUMBER | FOCAL LENGTH |
| 0 | STOP | | −0.1514 | | | |
| 1 | FIRST LENS | 1.3372 | 0.6989 | 1.544 | 55.0 | 2.830 |
| 2 | | 8.0300 | 0.1000 | | | |
| 3 | SECOND LENS | −16.9625 | 0.3397 | 1.629 | 23.0 | −4.560 |
| 4 | | 3.5818 | 0.2600 | | | |
| 5 | THIRD LENS | 6.1119 | 0.3513 | 1.629 | 23.0 | −79.860 |
| 6 | | 5.3402 | 0.3740 | | | |
| 7 | FOURTH LENS | −3.5649 | 0.3000 | 1.629 | 23.0 | 13.40 |
| 8 | | −2.6070 | 1.0077 | | | |
| 9 | FIFTH LENS | −1.9318 | 0.5910 | 1.544 | 55.0 | −4.980 |
| 10 | | −7.3731 | 0.2171 | | | |
| 11 | FILTER | INFINITY | 0.1100 | 1.517 | 64.2 | |
| 12 | | INFINITY | 0.7702 | | | |
| 13 | IMAGING PLANE | INFINITY | −0.0197 | | | |

FIG. 6

| THIRD EMBODIMENT |||||||
|---|---|---|---|---|---|---|
| F number= | 2.60 | TTL = | 5.20 | f = | 5.80 | |
| SURFACE NO. | | RADIUS OF CURVATURE | THICKNESS/ DISTANCE | REFRACTIVE INDEX | ABBE NUMBER | FOCAL LENGTH |
| 0 | STOP | | -0.1436 | | | |
| 1 | FIRST LENS | 1.2680 | 0.6627 | 1.544 | 55.0 | 2.680 |
| 2 | | 7.6147 | 0.0948 | | | |
| 3 | SECOND LENS | -16.0851 | 0.3222 | 1.639 | 27.0 | -4.320 |
| 4 | | 3.3965 | 0.2465 | | | |
| 5 | THIRD LENS | 5.7958 | 0.3331 | 1.639 | 27.0 | -75.720 |
| 6 | | 5.0639 | 0.3546 | | | |
| 7 | FOURTH LENS | -3.3805 | 0.2845 | 1.639 | 57.0 | 12.71 |
| 8 | | -2.4721 | 0.9555 | | | |
| 9 | FIFTH LENS | -1.8319 | 0.5604 | 1.544 | 55.0 | -4.730 |
| 10 | | -6.9917 | 0.2059 | | | |
| 11 | FILTER | INFINITY | 0.1043 | 1.517 | 64.2 | |
| 12 | | INFINITY | 0.7303 | | | |
| 13 | IMAGING PLANE | INFINITY | 0.2000 | | | |

FIG. 9

OPTICAL IMAGING SYSTEM

CROSS-REFERENCE TO RELATED APPLICATION(S)

This application claims the benefit under 35 USC 119(a) of Korean Patent Application No. 10-2015-0142839 filed on Oct. 13, 2015 in the Korean Intellectual Property Office, the entire disclosure of which is incorporated herein by reference for all purposes.

BACKGROUND

1. Field

The following description relates to an optical imaging system including lenses.

2. Description of Related Art

An optical imaging system mounted in a camera of a portable terminal includes a plurality of lenses. As an example, the optical imaging system includes five or more lenses in order to configure an optical system that has a high level of resolution.

In order to realize a dual-camera system, a camera module having a short focal length and a camera module having a long focal length are used, in that a dual-camera system uses both types of camera module. The camera module having the short focal length may be easily realized using an available optical imaging system. However, it is difficult to realize the camera module having the long focal length using the available optical imaging systems. Therefore, it is helpful to provide an optical imaging system appropriate for a camera module having a long focal length, for use in this context.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power, wherein an object-side surface of the first lens is convex and an image-side surface of the first lens is concave, a second lens having a negative refractive power, wherein an image-side surface of the second lens is concave, a third lens having a negative refractive power, a fourth lens having a positive refractive power, and a fifth lens having a negative refractive power, wherein the first to fifth lenses are sequentially disposed from an object side of the optical imaging system, towards an imaging plane.

An object-side surface of the second lens may be concave.
An object-side surface of the third lens may be convex.
An image-side surface of the third lens may be concave.
An object-side surface of the fourth lens may be concave.
An image-side surface of the fourth lens may be convex.
An object-side surface of the fifth lens may be concave.

The optical image system may satisfy $0.70<TTL/f<1.1$, in which TTL is a distance of the object-side surface of the first lens to the imaging plane, and f is an overall focal length of the optical imaging system.

The optical image system may satisfy $1.10<TTL/ImgH$, in which TTL is a distance of the object-side surface of the first lens to the imaging plane, and ImgH is ½ of a diagonal length of the imaging plane.

The optical image system may satisfy $20<FOV<35$, in which FOV is a half of a field of view of the optical imaging system.

The optical image system may satisfy where $0.16<R1/f<2.0$, in which R1 is a radius of curvature of the object-side surface of the first lens, and f is an overall focal length of the optical imaging system.

At least one of the first through fifth lenses may have a meniscus shape.

At least one of the first through fifth lenses may have an aspherical shape.

In another general aspect, an optical imaging system includes a first lens, including a convex object-side surface and a concave image-side surface, a second lens, including a concave object-side surface and a concave image-side surface, a third lens, including a convex object-side surface and a concave image-side surface, a fourth lens, including a concave object-side surface and a convex image-side surface, and a fifth lens, including a concave object-side surface and a convex image-side surface, wherein the first to fifth lenses are sequentially disposed from an object side of the optical imaging system, toward an imaging plane.

The first lens and the fourth lens may have the same refractive power.

The second lens and the third lens may have the same refractive power.

The optical imaging system may further include a stop located adjacent to the object-side surface of the first lens.

At least one of the first through fifth lenses may have a meniscus shape.

At least one of the first through fifth lenses may have an aspherical shape.

Other features and aspects will be apparent from the following detailed description, the drawings, and the claims.

BRIEF DESCRIPTION OF DRAWINGS

FIG. 3 is a table representing characteristics of lenses of the optical imaging system illustrated in the embodiment of FIG. 1.

FIG. 6 is a table representing characteristics of lenses of the optical imaging system illustrated in the embodiment of FIG. 4.

FIG. 9 is a table representing characteristics of lenses of the optical imaging system illustrated in the embodiment of FIG. 7.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
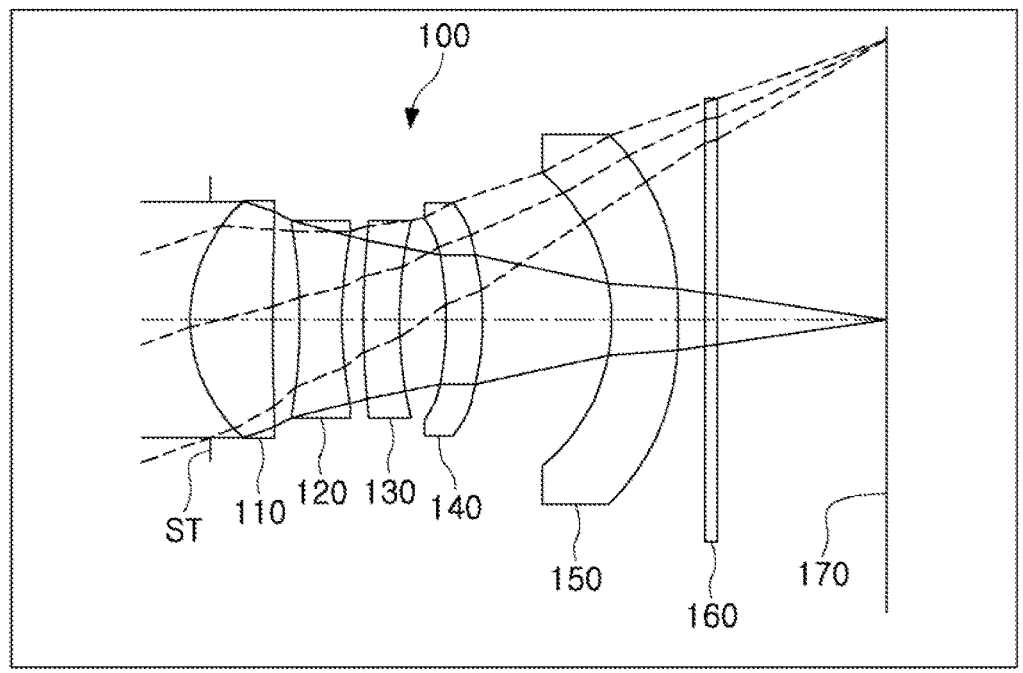
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it is to be understood that when an element, such as a layer, region or wafer, such as a substrate, is referred to as being "on," "connected to," or "coupled to" another element, the element is possibly directly "on," "connected to," or "coupled to" the other element or other elements intervening between the element and the other element are optionally present. In contrast, when an element is referred to as being "directly on," "directly connected to," or "directly coupled to" another element, there are no elements or layers intervening between the element and the other element. Like numerals are used to refer to like elements throughout. As used herein, the term "and/or" includes any and all combinations of one or more of the associated listed items.

It is to be apparent that though the terms first, second, third, and so on, are used herein to describe various members, components, regions, layers and/or sections, these members, components, regions, layers and/or sections are not to be limited by these terms. These terms are only used to distinguish one member, component, region, layer or section from another region, layer or section. Thus, a first member, component, region, layer or section discussed below could also be referred to as a second member, component, region, layer or section without departing from the embodiments.

Spatially relative terms, such as "above," "upper," "below," and "lower," and so on, are used herein for ease of description to describe one element's relationship to another element(s) as shown in the figures. It is to be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features, accordingly. Thus, the term "above" encompasses both the above and below orientations depending on a particular direction or viewpoint of the figures. The device may be otherwise oriented, such as being rotated 90 degrees or at other, arbitrary orientations, and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It is to be further understood that the terms "comprises," and/or "comprising" when used in this specification, specify the presence of stated features, integers, steps, operations, members, elements, and/or groups thereof, but these terms do not preclude the presence or addition of one or more other features, integers, steps, operations, members, elements, and/or groups thereof.

Hereinafter, embodiments are described with reference to schematic views illustrating the embodiments. However, in the drawings, for example, due to manufacturing techniques and/or tolerances, small modifications of the shape shown are possible. Thus, embodiments are not to be construed as being limited to the particular shapes of regions shown herein, for example, to include a change in shape resulting from manufacturing. The embodiments also may include features based on one or a combination of features presented in the embodiments discussed as examples.

The contents of the embodiments described below possibly have a variety of configurations and propose only a required configuration, but configurations are not limited to the described configurations and may include other features without departing from the embodiments presented.

An aspect of the present embodiments provides an optical imaging system having a long focal length.

In addition, in the present description, a first lens refers to a lens closest to an object or a subject to be photographed, while a fifth lens refers to a lens closest to an imaging plane or a corresponding image sensor. In addition, all of the radii of curvature and thicknesses of lenses, a through-the lens (TTL) aspect, an ImgH such as ½ of a diagonal length of the imaging plane, and focal lengths are represented by millimeters (mm). Further, thicknesses of the lenses, gaps between the lenses, and the TTL are distances in optical axes of the lenses. Certain of these metrics are discussed and defined further, below. Further, in a description for shapes of the lenses, the meaning referred to that one surface of a lens is convex is that an optical axis portion of a corresponding surface is convex, and the meaning referred to that one surface of a lens is concave is that an optical axis portion of a corresponding surface is concave. Therefore, although it is described that one surface of a lens is convex, an edge portion of the lens is possibly concave. Likewise, although it is described that one surface of a lens is concave, an edge portion of the lens is possibly convex.

In an embodiment, an optical imaging system includes an optical system including a plurality of lenses. For example, the optical system of the optical imaging system includes five lenses each having a refractive power. However, the optical imaging system is not to be limited to including only the lenses having the refractive power. For example, in such an embodiment, the optical imaging system includes a stop for controlling an amount of light. In addition, the optical imaging system furthers include an infrared cut-off filter filtering infrared light. Further, the optical imaging system further includes an image sensor, that is, an imaging device, for converting an image of a subject incident onto the optical imaging system, through the optical system, into electrical signals. Further, in an embodiment, the optical imaging system further includes a gap maintaining member for adjusting a gap between lenses.

In an embodiment, first to fifth lenses are formed of materials having a refractive index different from that of air. For example, the first to fifth lenses may be formed of plastic or glass. However, in other embodiment, other materials such as polyurethane based materials are used, as appropriate. At least one of the first to fifth lenses has an aspherical shape. As an example, only the fifth lens of the first to fifth lenses has the aspherical shape. In addition, in an embodiment, at least one surface of all of the first to fifth lenses is aspherical. In an example, an aspherical surface of each lens is represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$ Equation 1

In an example, c is an inverse of a radius of curvature of the lens, k is a conic constant, r is a distance from a certain point on an aspherical surface of the lens to an optical axis, A to J are aspherical constants, and Z is a distance between the certain point on the aspherical surface of the lens at the distance Y and a tangential plane meeting the apex of the aspherical surface of the lens.

In an embodiment, an optical imaging system includes five lenses, a filter, an image sensor, and a stop. Next, the above-mentioned components are described in further detail.

In this embodiment, the first lens has a refractive power. For example, the first lens has a positive refractive power.

The first lens may have a meniscus shape. For example, an object-side surface of the first lens is convex, and an image-side surface of the first lens is concave.

In such an embodiment, the first lens has an aspherical surface. For example, both surfaces of the first lens are aspherical. The first lens is formed of a material having high light transmissivity and excellent workability. For example, the first lens is possibly formed of plastic. In an embodiment, a variety of plastics are appropriate materials for use in the first lens. However, a material of the first lens is not to be limited to plastic. For example, the first lens is instead possibly formed of glass. In other embodiments, other appropriate materials that conform to the above characteristics with respect to desirable features of lens materials are used instead of plastic or glass.

In such an embodiment, the second lens has a refractive power. For example, the second lens has a negative refractive power.

The second lens may have a meniscus shape. For example, both surfaces of the second lens are concave.

In such an embodiment, the second lens has an aspherical surface. For example, an image-side surface of the second lens is aspherical. The second lens is formed of a material having high light transmissivity and excellent workability, such as discussed above with respect to the first lens. For example, the second lens is formed of the same material as the first lens, or another relevant candidate material such as an appropriate plastic or glass material, or another material with appropriate attributes.

In this embodiment, the second lens is formed of a material having a high refractive index. For example, the second lens is formed of a material having a refractive index of 1.60 or more. In this case, the second lens has an Abbe number of 30 or less. For example, an Abbe number is a measure of the dispersion of the material of a lens, with respect to variation of refractive index versus wavelength. The second lens formed of this material easily refracts light even while having a small curvature shape.

In such an embodiment, the third lens has a refractive power. For example, the third lens has a negative refractive power.

The third lens may have a meniscus shape. For example, an object-side surface of the third lens is convex, and an image-side surface thereof is concave.

In this embodiment, the third lens has an aspherical surface. For example, both surfaces of the third lens are aspherical. The third lens is formed of a material having high light transmissivity and excellent workability. For example, the third lens is formed of the same material as the other lenses, or another relevant candidate material such as an appropriate plastic or glass material, or another material with appropriate attributes.

The fourth lens has a refractive power. For example, the fourth lens has a positive refractive power.

The fourth lens may have a meniscus shape. For example, an object-side surface of the fourth lens is concave, and an image-side surface thereof is convex.

In such an embodiment, the fourth lens has an aspherical surface. For example, both surfaces of the fourth lens are aspherical. The fourth lens is formed of a material having high light transmissivity and excellent workability. For example, the fourth lens is formed of the same material as the other lenses, or another relevant candidate material such as an appropriate plastic or glass material, or another material with appropriate attributes.

In this embodiment, the fourth lens is formed of a material having a high refractive index. For example, the fourth lens is formed of a material having a refractive index of 1.60 or more. In this case, the fourth lens may have an Abbe number of 30 or less, as discussed previously. The fourth lens formed of this material easily refracts light even while having a small curvature shape.

In such an embodiment, the fifth lens has a refractive power. For example, the fifth lens has a negative refractive power.

The fifth lens may have a meniscus shape. For example, an object-side surface of the fifth lens is concave, and an image-side surface thereof is convex.

In this embodiment, the fifth lens has an aspherical surface. For example, both surfaces of the fifth lens are aspherical. The fifth lens may be formed of a material having high light transmissivity and excellent workability. For example, the fifth lens is formed of the same material as the other lenses, or another relevant candidate material such as an appropriate plastic or glass material, or another material with appropriate attributes.

The filter may filter a partial wavelength from light incident through the first to fifth lenses. For example, the filter filters an infrared wavelength of the incident light. However, this is only one example and filters that filter other wavelengths instead of or in addition to infrared wavelengths are also possible in other embodiments.

In an embodiment, the image sensor realizes a high resolution, such as a resolution of 1300 megapixels. For example, a unit size of the pixels configuring the image sensor may be 1.12 μm or a smaller value.

The stop may be disposed in order to adjust an amount of light incident onto the lenses. For example, the stop is disposed to be adjacent to the object-side surface of the first lens.

For example, the optical imaging system satisfies the following Conditional Expressions:

0.7<TTL/f<1.1  Conditional Expression 1

1.1<TTL/ImgH  Conditional Expression 2

$20 < \text{FOV} < 35$  Conditional Expression 3

$0.16 < R1/f < 2.0.$  Conditional Expression 4

For example, TTL denotes a distance from the object-side surface of the first lens to the imaging plane, f denotes an overall focal length of the optical imaging system, ImgH denotes a distance from a center of the imaging plane to a corner, FOV denotes a half of a field of view of the optical imaging system, and R1 denotes a radius of curvature of the object-side surface of the first lens.

The optical imaging system satisfying the above Conditional Expressions is easily miniaturized and is suitable to be mounted in a small terminal.

An optical imaging system according to a first embodiment is described further with reference to FIG. 1.

The optical imaging system 100 according to the first embodiment includes an optical system including a first lens 110, a second lens 120, a third lens 130, a fourth lens 140, and a fifth lens 150. In addition, in such an embodiment, the optical imaging system 100 includes a filter 160, an image sensor 170, and a stop ST.

In this embodiment, the first lens 110 has a positive refractive power, and an object-side surface of the first lens 110 is convex and an image-side surface of the first lens 110 is concave. The second lens 120 has a negative refractive power, and both surfaces of the second lens 120 are concave. The third lens 130 has a negative refractive power, and an object-side surface of the third lens 130 is convex and an image-side surface of the third lens 130 is concave. The fourth lens 140 has a positive refractive power, and an object-side surface of the fourth lens 140 is concave and an image-side surface of the fourth lens 140 is convex. The fifth lens 150 has a negative refractive power, and an object-side surface of the fifth lens 150 is concave and an image-side surface of the fifth lens 150 is convex. In such an embodiment, the stop ST is located adjacent to the object-side surface of the first lens.

Figure 2:
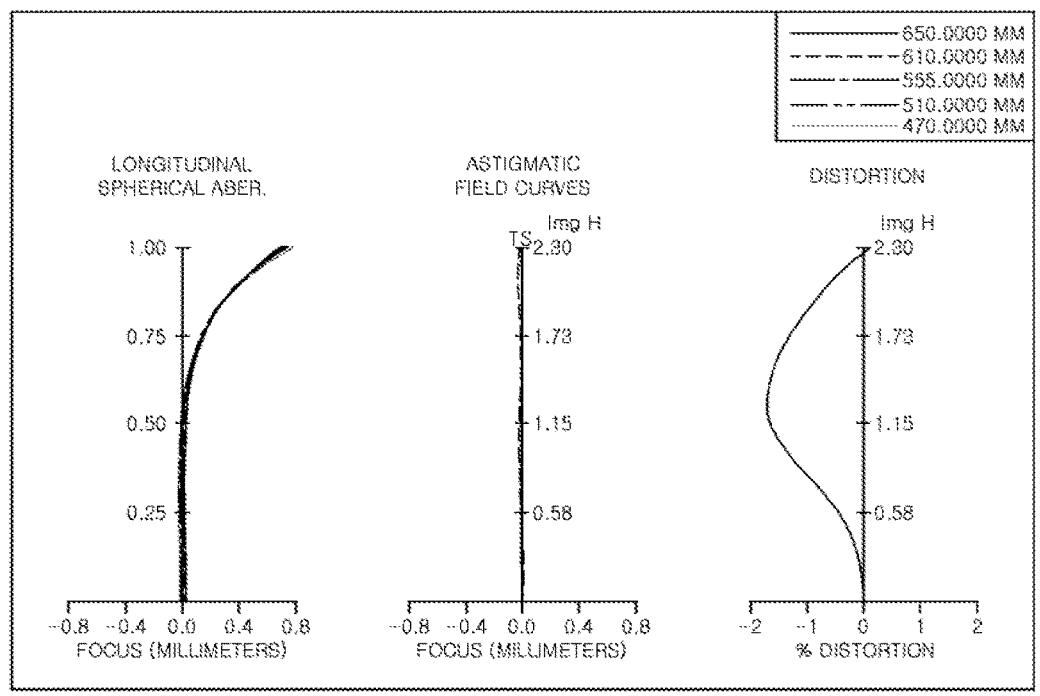
FIG. 2 is a set of graphs representing aberration curves of the optical imaging system illustrated in the embodiment of FIG. 1.

The optical imaging system configured as described above includes aberration characteristics as illustrated in FIG. 2. FIG. 3 is a table representing characteristics of lenses of the optical imaging system according to the first embodiment.

Figure 4:
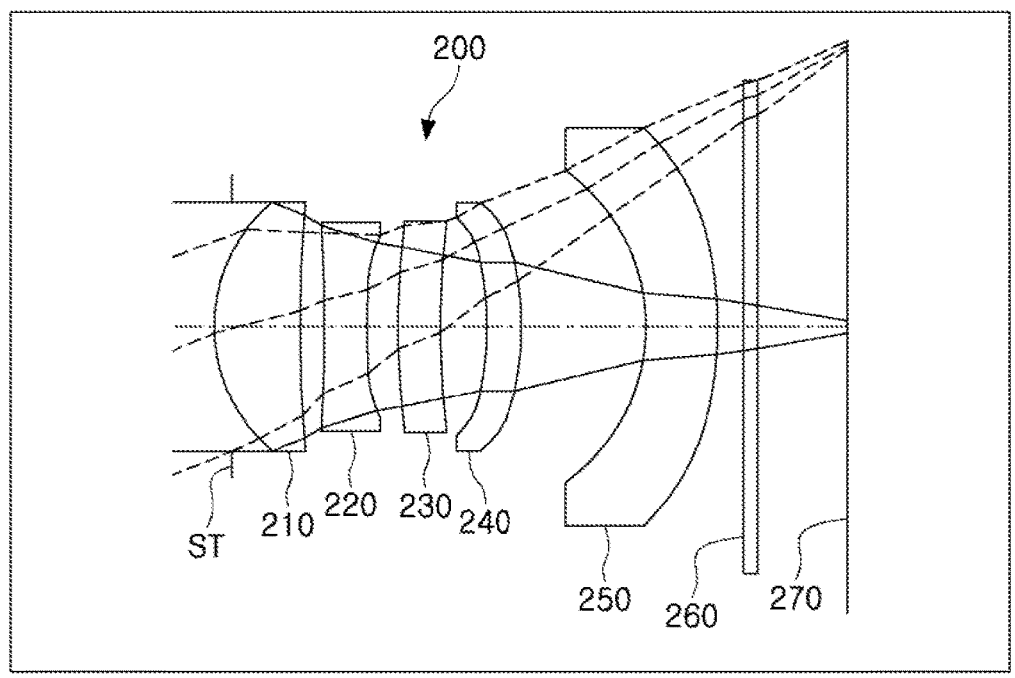
FIG. 4 is a view of an optical imaging system according to a second embodiment.

An optical imaging system according to a second embodiment is described further with reference to FIG. 4.

The optical imaging system 200 according to the second embodiment includes an optical system including a first lens 210, a second lens 220, a third lens 230, a fourth lens 240, and a fifth lens 250. In addition, in such an embodiment, the optical imaging system 200 includes a filter 260, an image sensor 270, and a stop ST.

In this embodiment, the first lens 210 has a positive refractive power, and an object-side surface of the first lens 210 is convex and an image-side surface of the first lens 210 is concave. The second lens 220 has a negative refractive power, and both surfaces of the second lens 220 are concave. The third lens 230 has a negative refractive power, and an object-side surface of the third lens 230 is convex and an image-side surface of the third lens 230 is concave. The fourth lens 240 has a positive refractive power, and an object-side surface of the fourth lens 240 is concave and an image-side surface of the fourth lens 240 is convex. The fifth lens 250 has a negative refractive power, and an object-side surface of the fifth lens 250 is concave and an image-side surface of the fifth lens 250 is convex. In such an embodiment, the stop ST is located adjacent to the object-side surface of the first lens.

Figure 5:
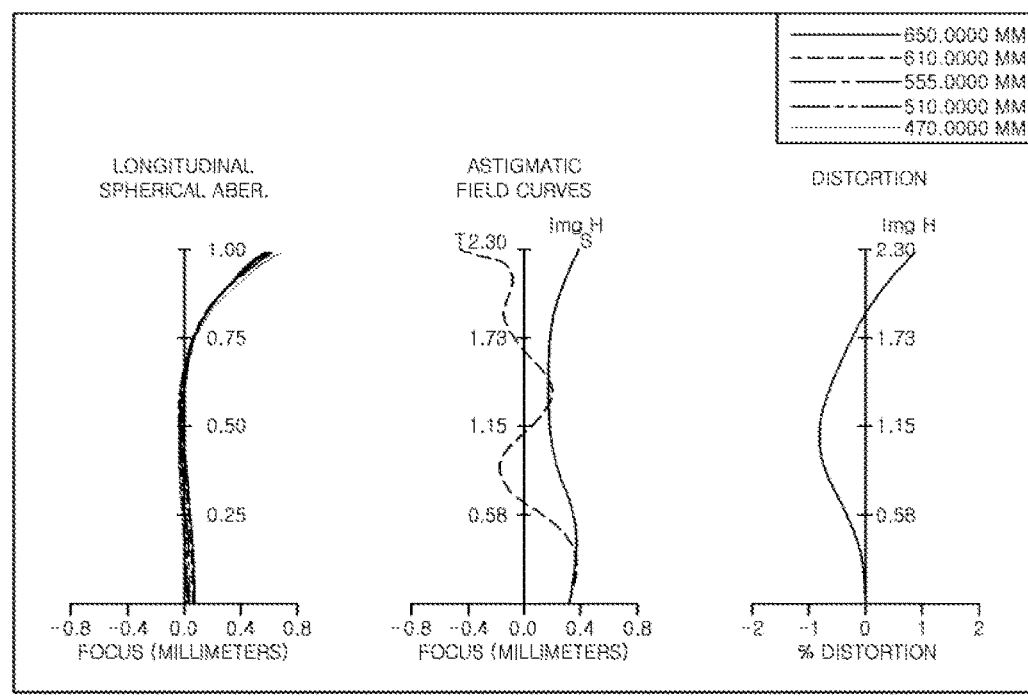
FIG. 5 is a set of graphs representing aberration curves of the optical imaging system illustrated in the embodiment of FIG. 4.

The optical imaging system configured as described above includes aberration characteristics as illustrated in FIG. 5. FIG. 6 is a table representing characteristics of lenses of the optical imaging system according to the second embodiment.

Figure 7:
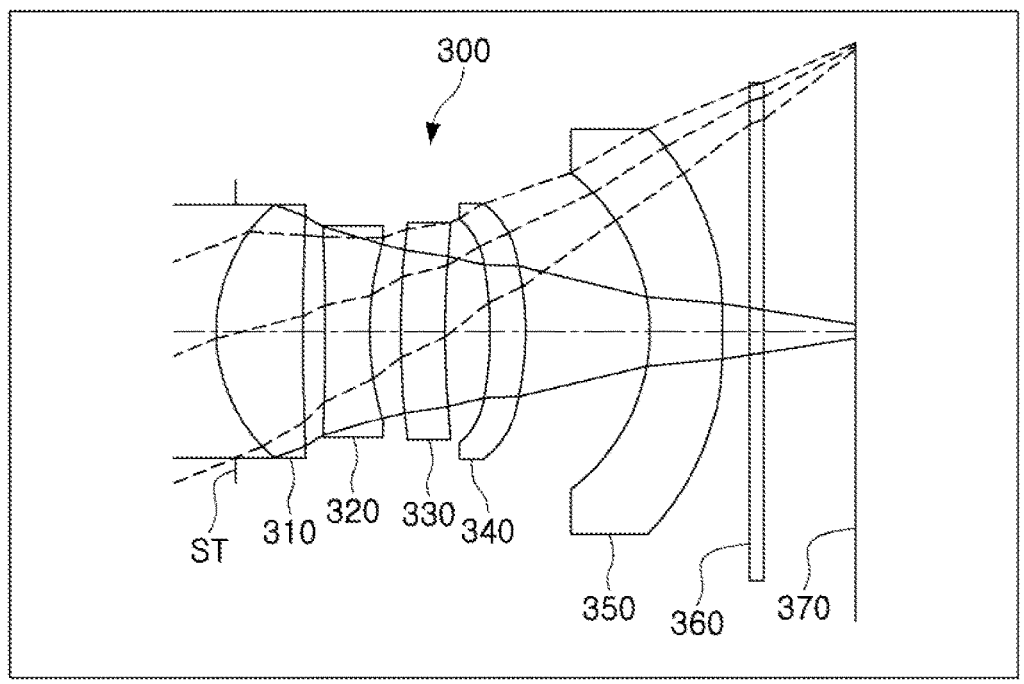
FIG. 7 is a view of an optical imaging system according to a third embodiment.

An optical imaging system according to a third embodiment is described further with reference to FIG. 7.

The optical imaging system 300 according to the third embodiment includes an optical system including a first lens 310, a second lens 320, a third lens 330, a fourth lens 340, and a fifth lens 350. In addition, in such an embodiment, the optical imaging system 300 may include a filter 360, an image sensor 370, and a stop ST.

In this embodiment, the first lens 310 has a positive refractive power, and an object-side surface of the first lens 310 is convex and an image-side surface of the first lens 310 is concave. The second lens 320 has a negative refractive power, and both surfaces of the second lens 320 are concave. The third lens 330 has a negative refractive power, and an object-side surface of the third lens 330 is convex and an image-side surface of the third lens 330 is concave. The fourth lens 340 has a positive refractive power, and an object-side surface of the fourth lens 340 is concave and an image-side surface of the fourth lens 340 is convex. The fifth lens 350 has a negative refractive power, and an object-side surface of the fifth lens 350 is concave and an image-side surface of the fifth lens 350 is convex. In such an embodiment, the stop ST is located adjacent to the object-side surface of the first lens.

Figure 8:
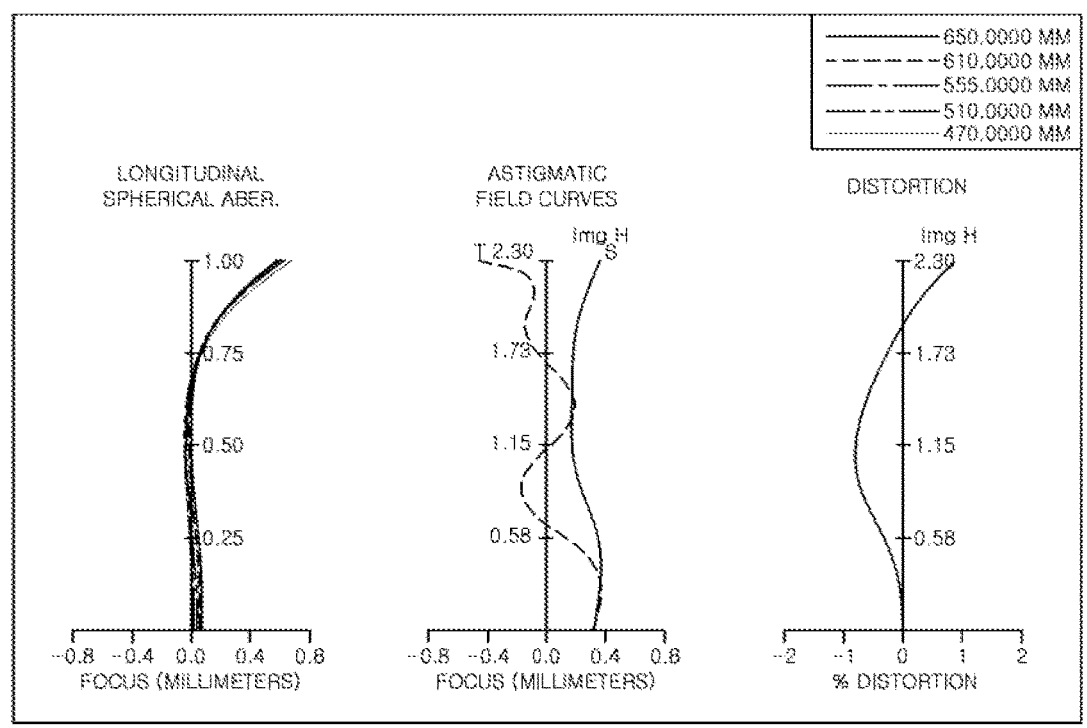
FIG. 8 is a set of graphs representing aberration curves of the optical imaging system illustrated in the embodiment of FIG. 7.

The optical imaging system configured as described above includes aberration characteristics as illustrated in FIG. 8. FIG. 9 is a table representing characteristics of lenses of the optical imaging system according to the third embodiment.

Table 1 represents optical characteristics of the optical imaging systems, according to the first to third embodiments. For example, according to these embodiments, the optical imaging system has an overall focal length f of 5.40 to 5.90. In the optical imaging system, a focal length f1 of the first lens is in a range of 2.50 to 3.00. In the optical imaging system, a focal length f2 of the second lens is in a range of −7.0 to −4.0. In the optical imaging system, a focal length f3 of the third lens is in a range of −81.0 to −25.0. In the optical imaging system, a focal length f4 of the fourth lens is in a range of 11.0 to 15.0. In the optical imaging system, a focal length f5 of the fifth lens is in a range of −6.0 to −4.0. In the optical imaging system, an overall length of the optical system is in a range of 5.10 to 5.80. A half of a field of view of the optical imaging system is in a range of 21.0 to 24.0. However, while these ranges are appropriate for certain embodiments, these ranges are not intended to be limiting, and certain other embodiments with values that fall outside of these ranges are possible.

TABLE 1

| Remarks | First Embodiment | Second Embodiment | Third Embodiment |
| --- | --- | --- | --- |
| f1 | 2.62 | 2.83 | 2.68 |
| f2 | −4.35 | −4.56 | −4.32 |
| f3 | −28.24 | −79.86 | −75.72 |
| f4 | 13.26 | 13.40 | 12.71 |
| f5 | −5.00 | −4.98 | −4.73 |
| TTL | 5.65 | 5.20 | 5.20 |
| f | 5.50 | 5.80 | 5.50 |
| F-number | 2.60 | 2.60 | 2.60 |
| FOV | 23.0 | 22.0 | 22.0 |
| ImgH | 2.30 | 2.30 | 2.30 |

Table 2 represents values of Conditional Expressions of the optical imaging systems according to the first to third embodiments.

TABLE 2

| Remarks | First Embodiment | Second Embodiment | Third Embodiment |
| --- | --- | --- | --- |
| TTL/f | 1.0273 | 0.8966 | 0.9455 |
| TTL/ImgH | 2.4565 | 2.2609 | 2.2609 |
| FOV | 23.00 | 22.00 | 22.00 |
| R1/f | 0.2378 | 0.2306 | 0.2306 |

As seen in Table 2, the optical imaging systems according to the first to third embodiments satisfy the Conditional Expressions, as presented above.

In an embodiment, the first and fourth lenses have the same refractive power. Also, in an embodiment, the second and third lenses have the same refractive power.

As set forth above, according to embodiments, an optical imaging system having a long focal length is realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens comprising a positive refractive power, wherein an object-side surface of the first lens is convex;
   a second lens comprising a negative refractive power, wherein an image-side surface of the second lens is concave;
   a third lens comprising refractive power, wherein an object-side surface of the third lens is convex and an image-side surface of the third lens is concave;
   a fourth lens comprising refractive power, wherein an object-side surface of the fourth lens is concave; and
   a fifth lens comprising refractive power, wherein an object-side surface of the fifth lens is concave and an image-side surface of the fifth lens is convex in a paraxial portion,
   wherein the first to fifth lenses are sequentially disposed from an object side of the optical imaging system, towards an imaging plane
   where $0.70 < TTL/f < 1.1$, in which TTL is a distance of the object-side surface of the first lens to the imaging plane, and f is an overall focal length of the optical imaging system, and
   a focal length f1 of the first lens is in a range of 2.50 to 3.00.

2. The optical imaging system of claim 1, wherein an object-side surface of the second lens is concave.

3. The optical imaging system of claim 1, wherein an image-side surface of the fourth lens is convex.

4. The optical imaging system of claim 1, where $1.10 < TTL/ImgH$, in which TTL is a distance of the object-side surface of the first lens to the imaging plane, and ImgH is ½ of a diagonal length of the imaging plane.

5. The optical imaging system of claim 1, where $20 < FOV < 35$, in which FOV is a half of a field of view of the optical imaging system.

6. The optical imaging system of claim 1, where $0.16 < R1/f < 2.0$, in which R1 is a radius of curvature of the object-side surface of the first lens, and f is an overall focal length of the optical imaging system.

7. The optical imaging system of claim 1, wherein one of the first through fifth lenses has a meniscus shape.

8. The optical imaging system of claim 1, wherein one of the first through fifth lenses has an aspherical shape.

9. An optical imaging system comprising:
   a first lens, comprising a convex object-side surface;
   a second lens, comprising a concave image-side surface;
   a third lens, comprising a convex object-side surface and a concave image-side surface;
   a fourth lens, comprising a concave object-side surface and a convex image-side surface; and
   a fifth lens, comprising a concave object-side surface and a convex image-side surface where the fifth lens crosses an optical axis,
   wherein the first to fifth lenses are sequentially disposed from an object side of the optical imaging system, toward an imaging plane,
   where $0.70 < TTL/f < 1.1$, in which TTL is a distance of the object-side surface of the first lens to the imaging plane, and f is an overall focal length of the optical imaging system, and
   a focal length f1 of the first lens is in a range of 2.50 to 3.00.

10. The optical imaging system of claim 9, wherein the first lens and the fourth lens have the same sign of refractive power.

11. The optical imaging system of claim 9, wherein the second lens and the third lens have the same sign of refractive power.

12. The optical imaging system of claim 9, further comprising:
    a stop located adjacent to the object-side surface of the first lens.

13. The optical imaging system of claim 9, wherein one of the first through fifth lenses has a meniscus shape.

14. The optical imaging system of claim 9, wherein one of the first through fifth lenses has an aspherical shape.

15. The optical imaging system of claim 1, wherein an image-side surface of the fifth lens is entirely convex.

* * * * *